2,800,470

SUBSTITUTED IMINODIBENZYLS

Walter Schindler, Riehen, near Basel, and Franz Hafliger, Basel, Switzerland, assignors, by mesne assignments, to Geigy Chemical Corporation, New York, N. Y., a corporation of Delaware No Drawing. Application February 15, 1956, Serial No. 565,525

Claims priority, application Switzerland September 22, 1954

4 Claims.  (Cl. 260—239)

The present application is a continuation-in-part of application Ser. No. 532,784, filed September 6, 1955, now abandoned.

Iminodibenzyl (10.11-dihydro-5-dibenzo [b. f.] azepine) is of interest as a starting material for different types of pharmacological active ingredients, which active ingredients are obtained therefrom by substitution at the nitrogen atom. For example, by introducing tertiary aminoalkyl radicals, substances with an antiallergic and sedative activity are obtained and by the introduction of tertiary aminoalkanoyl radicals substances with a local anaesthetic activity are obtained.

Iminodibenzyl can be obtained according to Thiele and Holzinger, A.305, 96 (1899) by heating equal parts of the base, 2.2-diaminodibenzyl and the dihydrochloride thereof for a considerable time at 265–275°. 2-nitrobenzyl chloride serves as starting product for the production of 2.2'-diaminodibenzyl. The former is converted by means of potassium lye into 2.2'-dinitrostilbene which can be reduced direct to form 2.2'-diamino-dibenzyl.

Substitution products of iminodibenzyl have not been known up to now. No positive results have as yet been attained by adapting the Thiele and Holzinger method to substituted starting products.

The surprising observation has now been made that good yields of dihalogen substituted iminodibenzyls of the general formula:

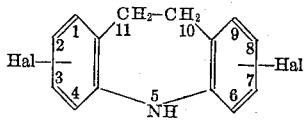

wherein Hal represents halogen, can be obtained by heating disubstituted 2.2'-diamino-dibenzyls of the general formula:

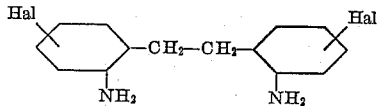

or the diphosphates thereof with polyphosphoric acid, at 220–300°, preferably at about 280°.

Dihalogen substituted 2.2'-diamino-dibenzyls are obtained from 2 molecules of halogen substituted 2-nitrotoluenes by oxidising, e. g. by means of amyl nitrite to form the corresponding dihalogen substituted 2.2'-dinitrodibenzyls and then catalytically hydrogenating. Not only the ring closing process to form the dihalogen iminodibenzyls proceeds according to the present invention with better yields than the known ring closing process to form unsubstituted iminodibenzyl but also the 2.2'-diamino-4.4'-dichlor-dibenzyl used, for example, as starting material is more easily attainable than 2.2'-diaminodibenzyl itself.

In contrast to the parent substance, the dihalogen substituted iminodibenzyls which can be produced according to the present invention no longer form any hydrochloride. On the other hand, they can be substituted at the nitrogen atom in a manner analogous to iminodibenzyl thus making the production of new groups of compounds possible.

For example, by reacting an N-(halogen-alkanoyl)-dihalogeno-iminodibenzyl (obtained from a dihalogeno-iminodibenzyl by acylating e. g. with a halogen fatty acid halide) with a dialkylamine having lower alkyl groups or with an alkylene imine with 5–6 ring members, basically acylated dihalogeno iminodibenzyls are obtained which are valuable local anaesthetics. They are administered by injection. By reacting a dihalogeno iminodibenzyl with a reactive ester of an alcohol of the formula HO-alkylene-Am (wherein alkylene represents an alkylene radical with 2–6 carbon atoms and Am represents a lower dialkylamino radical or an alkylenimino radical with 5–6 ring members), N-aminoalkylated dihalosubstituted iminodibenzyls are obtained which have an anti-allergic and sedative activity and can be used for the treatment of certain forms of mental disorders.

The following examples illustrate the production of the new compounds. Parts are given as parts by weight and their relationship to parts by volume is as that of grammes to cubic centimetres. The temperatures are in degrees centigrade.

*Example 1*

(a) 363 parts of 2-nitro-4-chlorotoluene are dissolved in 640 parts by volume of abs. ether and 234 parts of amyl nitrite are added. The solution obtained is cooled to about 10° and then added dropwise within about 1¼ hours at a temperature of 0–8° to a suspension of 136 parts of sodium ethylate in 640 parts by volume of abs. ether. The cooling bath is then removed and the reaction mixture is stirred for 18 hours at room temperature. After this time, 1000 parts of water are added in order to decompose the reaction mixture, the precipitate is drawn off under suction and stirred with about 300–400 parts by volume of acetone and again filtered under suction. After washing with ether, 2.2'-dinitro-4.4'-dichloro-dibenzyl is obtained which melts at 192–194°.

(b) 160 parts of the 2.2'-dinitro-4.4'-dichloro-dibenzyl obtained above are dissolved in 900 parts by volume of dioxan and, in the presence of 45 parts of Raney nickel, are hydrogenated at 40–50° at atmospheric pressure. The calculated amount of hydrogen (6 mol) is taken up after about 24 hours. The whole is then heated on a steam bath to about 90–95° and the catalyst is removed by filtration under suction. On evaporating the dioxan solution, the 2.2'-diamino-4.4'-dichlorodibenzyl crystallises out. It melts at 143°.

To produce 3.7-dichloro-iminodibenzyl it is not necessary to isolate the free diamine but 200 parts of phosphoric acid (2.2 mol) are added to the hot dioxan solution whereupon the diphosphate immediately crystallises out. After standing in ice, it is removed by filtration under suction, washed with a little ethyl acetate and then dried at 100°. The diphosphate melts at 246°.

(c) 100 parts of 2.2'-diamino-4.4'-dichloro-dibenzyl diphosphate are mixed with 300 parts of polyphosphoric acid (produced by dissolving 50 parts of phosphorus pentoxide in 250 parts of orthophosphoric acid) and the whole is heated for 40 minutes in an air bath to 280° whereupon the reaction product forms on the surface. The mixture is then cooled, poured into 1500 parts of ice water and extracted twice with ether. The ether solutions are washed with 2 N-hydrochloric acid and water and then dried over sodium sulphate. The ether is distilled off and the reaction product is crystallised from benzene (B. P. 80–100°). The melting point of 3.7-dichloro-iminodibenzyl is 114–115°.

Example 2

(a) A solution of 172 parts of 6-chloro-2-nitrotoluene (1 mol, B. P.₁₄ 120°) and 117 parts of amyl nitrite (1 mol) in 700 parts by volume of cyclohexane are added dropwise while stirring at 2–5° to a suspension of 68 parts of sodium ethylate (1 mol) in 300 parts by volume of abs. ether. The whole is then stirred for 6 hours at 5–7° and then for a further 4 hours at room temperature. The reaction mixture is decomposed with 1000 parts by volume of water, filtered under suction and the residue is crystallised from acetone. The 2.2'-dinitro-6.6'-dichloro-dibenzyl then melts at 135°.

(b) The dinitro compound is hydrogenised at 40–50° in dioxan solution in the presence of 45 parts of Raney nickel until the theoretical amount of hydrogen (6 mol) has been taken up. The calculated amount of phosphoric acid (2.2 mol) is added to the dioxan solution from which the catalyst has been removed whereupon the diphosphate of 2.2'-diamino-6.6'-dichloro-dibenzyl precipitates. It is drawn off under suction and dried. M. P. 216–218°.

(c) 49 parts of the diphosphate are heated for 40 minutes at 280–290° with 150 parts of polyphosphoric acid (produced by dissolving 25 parts of phosphorus pentoxide in 125 parts of orthophosphoric acid). The solution obtained is then cooled, the reaction mixture is poured on to ice and ethered out. The ethereal solution is washed with 2 N-hydrochloric acid, dried and evaporated. 1.9-dichloro-iminodibenzyl is obtained by recrystallising from benzine. M. P. 114–115°.

3.7-dibromo-iminodibenzyl for example, is obtained in an analogous manner.

What we claim is:

1. A substituted iminodibenzyl corresponding to the formula:

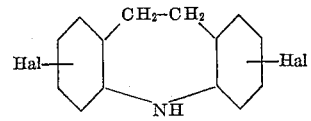

wherein Hal represents a member selected from the group consisting of chlorine and bromine.

2. 3.7-dichloro-iminodibenzyl.
3. 1.9-dichloro-iminodibenzyl.
4. Process for the production of a substituted iminodibenzyl of the formula given in claim 1, comprising heating the diphosphate of a disubstituted 2.2'-diamino-dibenzyl corresponding to the formula:

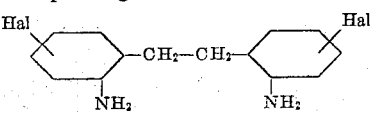

wherein Hal represents a member selected from the group consisting of chlorine and bromine, with a polyphosphoric acid at a temperature of at least 220° and at most 300°.

References Cited in the file of this patent

UNITED STATES PATENTS

| | | |
|---|---|---|
| 2,554,736 | Haefliger et al. | May 29, 1951 |
| 2,666,051 | Haefliger et al. | Jan. 12, 1954 |